UNITED STATES PATENT OFFICE.

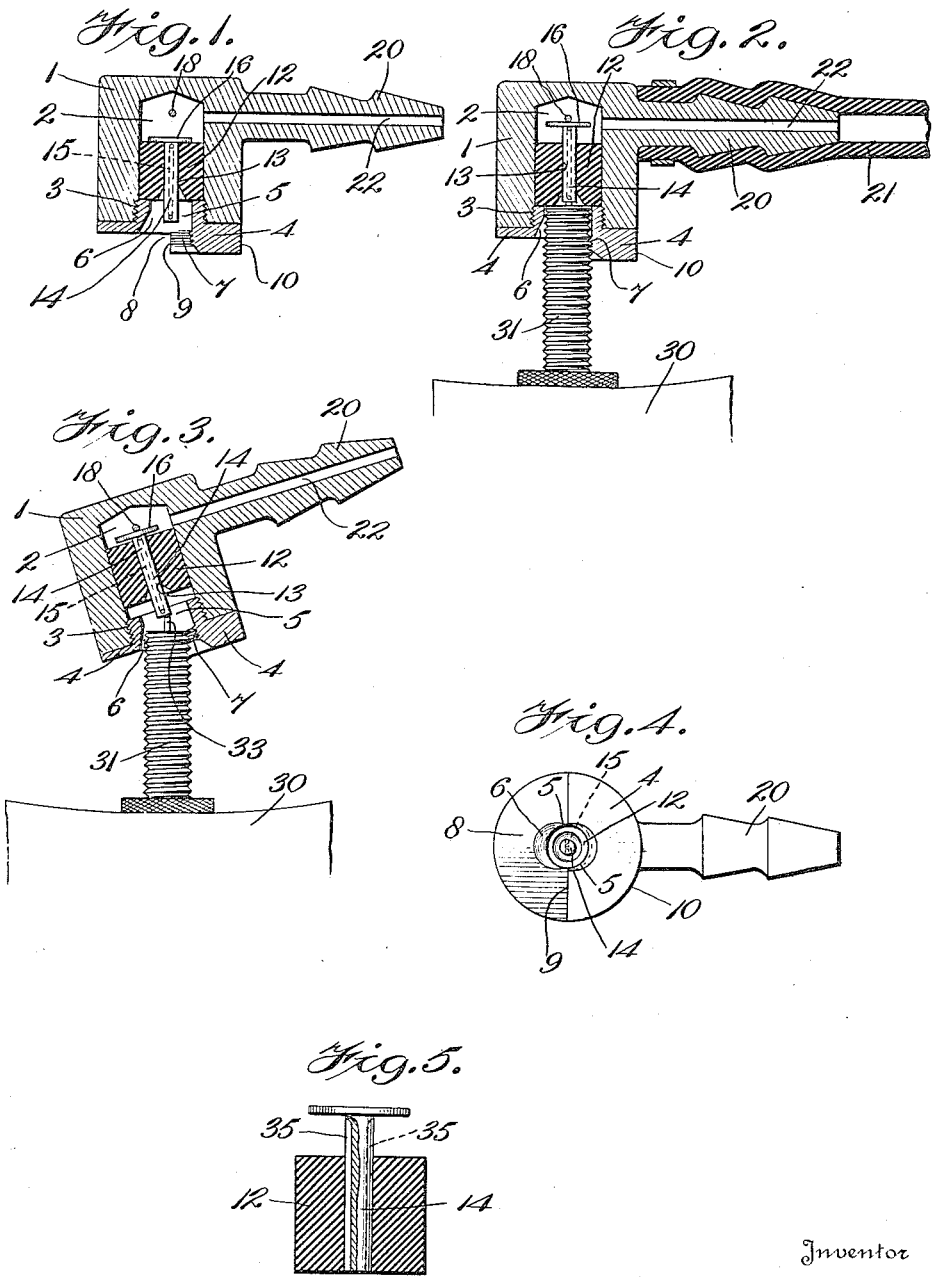

NORMAN S. McEWEN, OF NASHVILLE, TENNESSEE.

PNEUMATIC COUPLING.

1,245,115.  Specification of Letters Patent.  Patented Oct. 30, 1917.

Application filed January 15, 1917. Serial No. 142,488.

*To all whom it may concern:*

Be it known that I, NORMAN S. McEWEN, a citizen of the United States, residing at Nashville, in the county of Davidson and State of Tennessee, have invented certain new and useful Improvements in Pneumatic Couplings; and I do hereby declare the following to be a full, clear, and exact description of the invention, such as will enable others skilled in the art to which it appertains to make and use the same.

This invention relates to couplings for pneumatic tire pumps and has for its object to provide a coupling of this nature which will be simple in construction, comparatively inexpensive to manufacture and more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a longitudinal sectional view of one form of coupling made in accordance with this invention;

Fig. 2 is a view similar to Fig. 1, showing the device fully engaged with the valve of a pneumatic tire;

Fig. 3 is a view similar to Fig. 2 but showing the method of engaging and disengaging the parts;

Fig. 4 is a bottom plan view of the parts illustrated in Fig. 1; and

Fig. 5 is a detail sectional view, partly in elevation, of a slightly modified form of piston construction.

1 indicates the body portion of the coupling, provided with a bore or chamber 2, screw threaded as at 3 to receive a nut or plug 4. The nut 4 is also provided with a bore 5 having a flaring or tapered portion 6 extending approximately 180° around its circumference, as will be clear from Figs. 1 and 4. The side of the bore 5 opposite said flaring portion 6 is screw threaded as at 7, and the said nut 4 is cut away as at 8 so that the said screw threads extend only approximately 180° around said bore. This said cutaway portion 8 also provides a face 9 which together with the face 10 is adapted to be engaged by a wrench or other tool to facilitate the engagement of the screw threads 3.

Mounted within the chamber 2 is a plunger or piston 12, preferably made of rubber, and said plunger is provided with a central opening 13 in which fits the pin 14, as will be clear from the drawings.

The said pin 14 is provided with a duct or channel 15 for the passage of air, and the said pin is also provided with a head 16, adapted to contact with a pin or stop 18 extending across the chamber 2, for a purpose to be more fully disclosed below.

The body portion 1 is provided with the usual extension 20 to which may be attached the hose or other pump connection 21 and the said extension 20 is provided with the usual bore 22, communicating with the bore or chamber 2.

The operation of the coupling is as follows:—When it is desired to inflate a pneumatic tire such as 30, having a valve nipple such as 31, the coupling is first inclined, as shown in Fig. 3, whereupon the flaring portion 6 will guide the said nipple 31, causing it to enter the bore 5 without engaging the screw threads 7 thereof. As the relative movement of the coupling is continued the end of the pin 14 will engage the stem 33 of the tire valve not shown, forcing it in and unseating the said valve. The coupling is then straightened to the position illustrated in Fig. 2, whereupon air under pressure will be introduced into the chamber 2 from the bore 22 and will force down the rubber plunger or washer 12 causing it to seat firmly upon the end of the nipple 31, and form an air-tight joint therewith. Said air now passes through the duct or channel 15 in the pin 14 and through the tire valve into the tire 30.

It will be apparent that when the coupling is straightened from the position shown in Fig. 3 to that shown in Fig. 2, the threads 7 in the bore 5 will engage those on the nipple 31 and thus tend to lock the said coupling in this position and thereby prevent its displacement until it is again inclined to the position shown in Fig. 3.

The pin 18 merely serves as a stop to limit the upward movement of the pin 14, and to cause the latter to force in the valve stem 33 of the tire valve and to thereby unseat the latter. If desired, the said pin 18 may be dispensed with and the said tire valve unseated by the pressure of the incoming air, but in such case it will not be possible to secure quite as high a pressure within the tire as when the said pin 18 is used to forcibly unseat said tire valve.

In Fig. 5 there is illustrated a slightly modified form of pin 14 which instead of having an interior duct or channel as above disclosed, is provided with flutes or grooves 35 on its exterior to permit the passage of the air.

It is obvious that those skilled in the art may vary the details of construction as well as the arrangement of parts without departing from the spirit of the invention and therefore I do not wish to be limited to the above disclosure except as may be required by the claims.

What I claim is:—

1. In a coupling of the class described the combination of a body member provided with a chamber; a nut having a bore secured within one end of said chamber, said bore being provided with a flared portion and with mutilated screw threads; a plunger within said chamber adapted to form an air tight joint with the nipple of a tire valve; and a pin provided with an air passage slidably mounted in said plunger, substantially as described.

2. In a coupling of the class described the combination of a body member provided with a chamber; a nut having a bore secured within one end of said chamber, said bore being provided with mutilated screw threads and said nut being thickened around said screw threads to form an abrupt shoulder; a yielding plunger in said chamber adapted to form an air tight joint with the nipple of a tire valve; and a pin provided with a head and with an air passage slidably mounted in said plunger, substantially as described.

3. In a coupling of the class described the combination of a body member provided with a chamber and an extension having an air passage; a nut provided with a bore and a cutaway portion, said bore having a flared portion and being provided with mutilated screw threads opposite said flared portion, whereby a valve nipple may freely enter said bore when the coupling is inclined, and be locked when said coupling is straightened; a plunger within said chamber adapted to form an airtight joint with said valve nipple when the coupling is in its said straightened position; a pin having an air passage slidably mounted in said plunger and adapted to control the valve within said nipple; and means adapted to limit the movement of said pin, substantially as described.

In testimony whereof I affix my signature, in presence of two witnesses.

NORMAN S. McEWEN.

Witnesses:
ETHEL McE. ULMAN,
WM. A. ULMAN.